Patented July 4, 1950

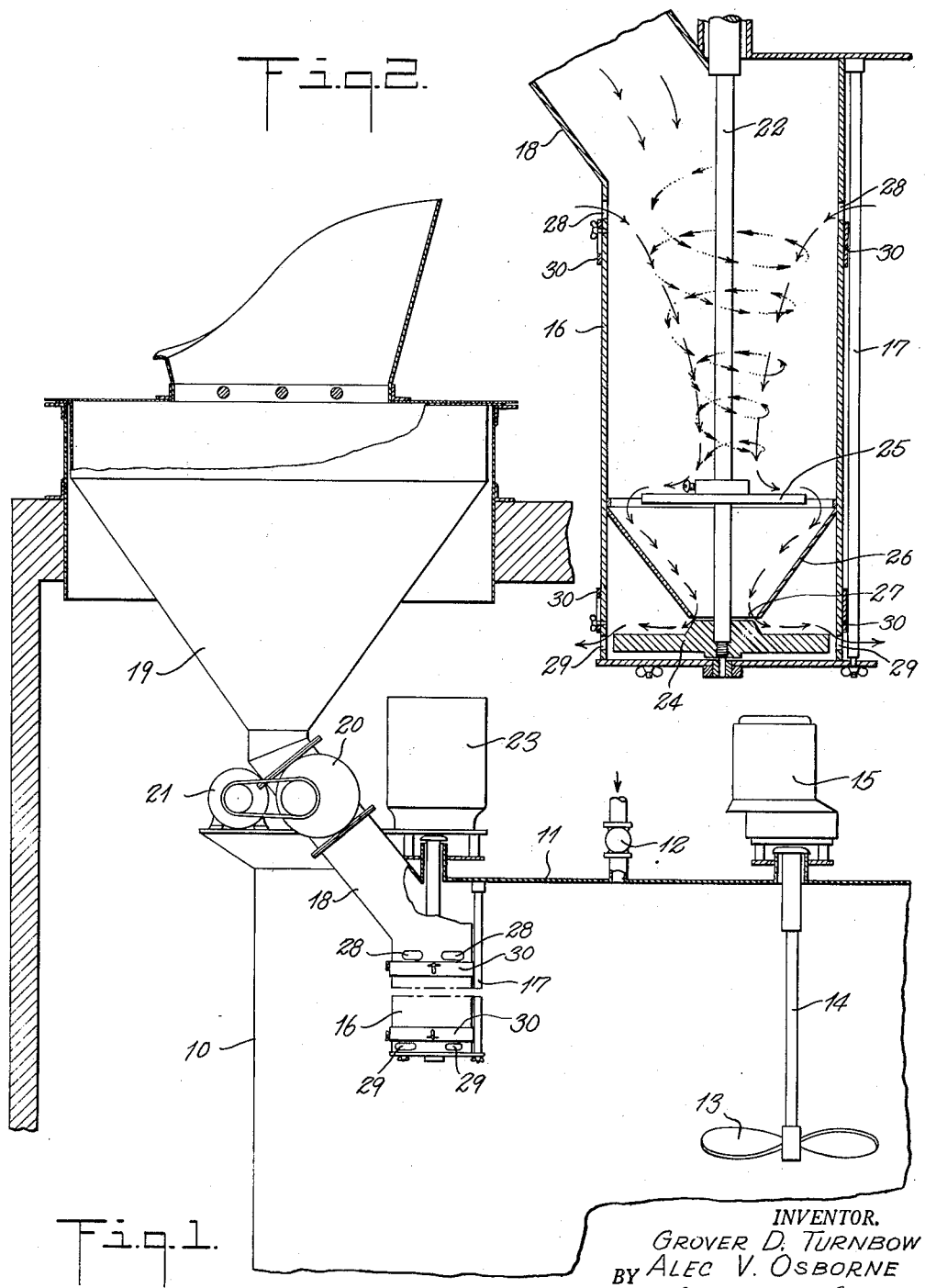

2,513,382

UNITED STATES PATENT OFFICE 2,513,382

MIXING DEVICE

Grover D. Turnbow, Oakland, and Alec V. Osborne, Mill Valley, Calif., assignors, by mesne assignments, to Chester-Jensen Company, Chester, Pa., a corporation of Pennsylvania Application June 13, 1947, Serial No. 754,500

3 Claims. (Cl. 259—8)

This invention relates to mixing devices and more especially to a device for mixing powder in a liquid.

An object of this invention is a device which will thoroughly uniformly and efficiently mix powder with a liquid at a high speed with substantially no foam being produced in the mixture.

A device embodying the invention is of particular utility in the reconstitution of powdered milk to form whole milk by mixing the powdered milk with water. However, the principles embodied in the device adapt it to the mixing of many other powdered materials with suitable liquids as will suggest themselves to one skilled in the art. Also, the device may be used to effect mixing of liquids. The main feature of the device is that it is of such design as to prevent air being drawn into the mixture, thereby avoiding the production of foam in the mixture.

Other objects, novel features and advantages of this invention will become apparent from the following specification and accompanying drawings, wherein:

Fig. 1 is a fragmentary section through a device embodying the invention, and

Fig. 2 is an enlarged section of a portion of Fig. 1.

A vat 10 is equipped with a cover 11 through which extends a valve-controlled water supply pipe 12. The vat is also equipped with a drainage pipe (not shown). A stirrer 13 is supported within the vat 10 by a shaft 14 rotatably journalled in the cover 11 and driven by a suitable motor 15.

A closed bottom cylinder 16 is supported from the cover 11 by tie rods 17 and is formed with an inclined inlet chute 18 extending through the cover 11. Above the vat is arranged a hopper 19, the outlet of which communicates with the inlet of a rotating measuring valve 20 of conventional construction, the outlet of which communicates with the chute 18. A motor 21 is provided for rotating the measuring valve at any desired speed.

A suitably journalled shaft 22 is arranged axially of the cylinder 16 and is rotated by any suitable drive means such, for example, as a motor 23. An impeller 24 is fixed to the lower end of the shaft 22 while a solid disk 25 is adjustably supported by the shaft 22 above the impeller 24. The cylinder supports a conical shelf 26 having a central aperture 27 through which the shaft 22 extends. The lower end of the shelf 26 terminates adjacent the impeller 24 and the disk 25 is located above the central aperture 27. In the cylinder wall are provided inlet ports 28 near the upper end of the cylinder and outlet ports 29 at the lower end of the cylinder.

In the operation of the above-described apparatus for the re-constitution of powdered milk, the vat 10 is filled with water above the level of the inlet ports 28 of the cylinder 16, thereby also filling the cylinder with water. A charge of powdered milk is introduced into the hopper 19. The impeller 24 is rotated at sufficiently high speed to produce a hollow core vortex in the cylinder terminating at the disk 25. The powdered milk is fed by the meter valve 20 through the chute 18 into the cylinder 16 at a predetermined rate. Upon entering the cylinder, the powdered milk contacts the surface of the vortex and is carried with the liquid down around the disk 25 to the impeller 24 from which it is thrown outwardly by centrifugal force. In its passage downwardly, the powder is mixed thoroughly and uniformly with the liquid. Recirculation in the cylinder 16 is prevented by the shelf 26 and the mixed liquid and powder are forced outwardly through the ports 29, thereby causing inflow of water through the ports 28. The disk 25 effectively seals the bottom of the vortex and prevents air from passing to the impeller, thereby avoiding the production of foam by the action of the impeller in agitating the liquid.

The mixture discharged through the ports 29 is further agitated by the stirrer 13. Recirculation continues through the cylinder 16 until the proper amount of powdered milk has been mixed with the water in the vat to produce whole milk. The mixture in the vat is then drawn off and the operation above described is repeated with a fresh batch of water and a fresh charge of powdered milk.

Suitable means are provided for varying the rotational speed of the meter valve 20 to regulate the flow of powdered milk into the cylinder 16 and vertically adjustable collars 30 also are provided on the cylinder for varying the effective areas of the ports 28 and 29 to control liquid circulation through the cylinder 16. Also, the disk 25 is adjustable on the shaft 22 to vary the depth of the vortex.

Although the re-constitution of powdered milk has been specifically described, it is apparent that the apparatus and method may equally well be used for the mixing of many other forms of powdered material in suitable liquids. Further-more, it is to be understood that various modifications may be made both in the apparatus and the method herein described, without in any way departing from the spirit of the invention as defined in the appended claims.

We claim:

1. Apparatus of the character described comprising a vat, a vertical closed bottom cylinder located in said vat, ports located in said cylinder wall adjacent its top below the level of the vat rim and at its bottom, a shaft rotatably supported in said cylinder, an impeller fixed to said shaft adjacent the bottom of said cylinder, means for rotating said shaft, a conical shelf above said impeller and having a central opening through which said shaft extends, and a disk supported by said shaft above the level of the rim of said shelf.

2. Apparatus of the character described comprising a closed top vat, a vertical closed bottom cylinder located in said vat, said cylinder having inlet ports located in its wall adjacent its top and below the top of said vat and said cylinder having outlet ports adjacent its bottom, a shaft rotatably supported in said cylinder, an impeller fixed to said shaft adjacent the bottom of said cylinder, a shelf in said cylinder above said impeller dividing said cylinder into upper and lower compartments and having an opening through which said shaft extends, a disk supported by said shaft above the level of said shelf, means for filling said vat with liquid and means for delivering powder at a uniform rate to the upper compartment of said cylinder adjacent the upper end of the latter.

3. Apparatus of the character described comprising a vat, a vertical closed bottom cylinder located in said vat and having adjustable inlet ports located in its wall adjacent its top below the level of the top of the vat and adjustable outlet ports located in said wall adjacent the bottom of said cylinder, a shaft rotatably supported in said cylinder, an impeller fixed to said shaft adjacent the bottom of said cylinder, means for rotating said shaft, a shelf above said impeller dividing said cylinder into an upper and a lower compartment and having an opening through which said shaft extends, a disk adjustably supported by said shaft above said shelf, means for delivering powder at a uniform rate to the upper compartment of said cylinder above the level of said inlet ports, a stirrer rotatably supported in said vat, means for rotating said stirrer, and means for adjusting the sizes of said inlet and outlet ports of said cylinder.

GROVER D. TURNBOW.
ALEC V. OSBORNE.

REFERENCES CITED

The following references are of record in the file of this patent:

UNITED STATES PATENTS

| Number | Name | Date |
|---|---|---|
| 757,375 | West | Apr. 12, 1904 |
| 1,514,118 | Wright | Nov. 4, 1924 |
| 1,788,345 | Skirvin | Jan. 6, 1931 |
| 2,071,393 | Doherty | Feb. 23, 1937 |
| 2,183,763 | Brown | Dec. 19, 1939 |
| 2,350,044 | Kantor | May 30, 1944 |
| 2,408,775 | Greenwood | Oct. 8, 1946 |

FOREIGN PATENTS

| Number | Country | Date |
|---|---|---|
| 289,186 | Great Britain | Apr. 26, 1928 |